United States Patent [19]

Nassehi

[11] Patent Number: 5,642,359

[45] Date of Patent: Jun. 24, 1997

[54] MULTIPLEXING DEVICE FOR A REDUNDANT CHANNEL BUS

[75] Inventor: Mohammed Mehdi Nassehi, Horgen, Switzerland

[73] Assignee: IBM Corporation, Armonk, N.Y.

[21] Appl. No.: 495,535

[22] PCT Filed: Jun. 2, 1993

[86] PCT No.: PCT/EP93/01385

§ 371 Date: Jul. 28, 1995

§ 102(e) Date: Jul. 28, 1995

[87] PCT Pub. No.: WO94/28484

PCT Pub. Date: Dec. 8, 1994

[51] Int. Cl.$^6$ ....................... H04J 3/14
[52] U.S. Cl. ....................... 370/228; 395/182.02
[58] Field of Search ....................... 370/16, 60, 65, 370/65.5, 85.9, 94.3, 228, 360, 361, 380

[56] References Cited

U.S. PATENT DOCUMENTS

| | | | |
|---|---|---|---|
| 4,701,756 | 10/1987 | Burr | 370/60 |
| 5,229,990 | 7/1993 | Teraslinna | 370/16 |
| 5,331,631 | 7/1994 | Teraslinna | 370/16 |
| 5,361,249 | 11/1994 | Monastra et al. | 370/65.5 |
| 5,459,718 | 10/1995 | Kusano | 370/65.5 |

*Primary Examiner*—Douglas W. Olms
*Assistant Examiner*—Min Jung
*Attorney, Agent, or Firm*—Jeanine S. Ray-Yarletts

[57] ABSTRACT

The present application concerns a multiplexing device (12,14) for a redundant channel bus (13). It comprises two arrays (12,14) of cascaded crosspoint cells, connected to opposite ends of the bus (13). The crosspoint cells of the first (12) of said arrays have means for establishing n data paths from n input data lines to n channels of n+x channels, and the crosspoint cells of the second array (14) have means to establish n corresponding data paths from the n channels to n output data lines. Further, the crosspoint cells comprise means to identically alter data paths in both arrays, said means being controlled by the means to recognize a faulty channel. The multiplexer is designed with a minimum number of gates, thus, providing a fast device for circumventing faulty channels. It is useful for fast and secure data transmission, especially suitable as a backbone bus device between independent central processing units.

7 Claims, 4 Drawing Sheets

MULTIPLEXING DEVICE FOR A REDUNDANT CHANNEL BUS

The invention relates to a multiplexing device for a redundant channel bus. A channel bus is a physical arrangement of at least two signal lines (channels) between a data transmitting device and a data receiving device able to transmit signals in a parallel mode. A redundant channel is a channel not used under the normal, i.e. undisturbed operating conditions of the bus.

BACKGROUND OF THE INVENTION

The technical field of the invention is computer and communication systems having bus systems based either on parallel wired connections or on parallel optical links, such as laser diode arrays connected to corresponding photodiode arrays by one or more optical fibers.

Failure of a single channel may occur due to a disruption of the signal line, due to a short circuit along the line, or the like. In an optical bus, one of the light emitting devices, for example a laser diode, or one of the light detecting device may cease to operate. Also, the transmitting fiber can break or its transmission properties can otherwise be deteriorated. The likelihood of bus failures increases with the number of connected devices and corresponding signal lines.

It is known that any probable interruption of the data transmission due to faulty channels can be met by providing additional channels which take the place of those channels which are not transmitting properly. As the rerouting of the data through a redundant channel only occurs when one of the default channels fails, the technique is known as dynamic-redundancy technique.

This technique comprises two mechanisms: one for detecting the faulty channel; and another to relocate the data flow through one of the redundant channels.

Depending on the cause of the failure, the faulty channel may be recognized at the transmitting and receiving end of the bus simultaneously, for example if a laser diode or another transmitting component is identified as faulty, or only at the receiving end. In the latter case, the failure has to be reported back to the transmitting end of the bus. However, such methods are known to a person skilled in the art and are not the concern of this invention.

The invention relates to the fault-masking mechanism of the dynamic-redundancy technique, i.e. the routing of the data flow through one of the redundant channels.

Routing techniques as such are also widely known in the various fields of data transmission. For example, cascaded switch architectures like Batchef-Banyan soding circuits are used to direct data into the channels identified by a destination address carried by the transmitted data. In SU-A-1249503 (Derwent Abstract) and SU-A-553619 (Derwent Abstract) other techniques to avoid faulty channels are described.

It is an object of the invention to provide a cost-effective device rerouting the data flow from a faulty channel to a redundant channel. More specifically, the device should be suitable for high-speed applications, especially for optical bus systems. The new device should further consists of only a minimal number of gates as such gates cause a delay of the data transfer.

SUMMARY OF THE INVENTION

According to the invention, the new multiplexing device for a redundant channel bus comprises n+x channels with x being the number of redundant channels, means for recognizing a faulty channel, and two arrays of cascaded crosspoint cells, connected to opposite ends of the bus, with the crosspoint cells of a first of the arrays having means for establishing n data paths from n input data lines to n channels of n+x channels, and the crosspoint cells of the second array having means for establishing n data paths from n channels to n output data lines, and the crosspoint cells having means for identically altering data paths in both arrays, said means being controlled by the means for recognizing a faulty channel.

Each array forms in itself n bifurcating trees with a minimum number of crosspoint cells, each of the n trees rooting in a crosspoint cell connected to a data line and having x+1 pending crosspoint cells connected to x+1 channels, each crosspoint cell comprising means for establishing a data path between the data line and one channel of the x+1 channels through each array, the data paths only differing by their directions, and means for rerouting said data path to a neighboring channel within the x+1 channels, if the one channel or any preceding channel is recognized as faulty.

Thus, each input data line and each output data line ends or starts, respectively, with a tree connected to a number of channels of the bus. This number exceeds the number of redundant channels by one.

The tree is formed by crosspoint cells as vertices and data lines as arcs or edges. Seen from the root in the direction of the pending vealices, a data line splits into two at each vealice, i.e. it is bifurcating. The tree is, however, designed to have a minimum number of crosspoint cells. Thus, two adjacent vertices are followed by three and not by four vertices. The same applies for the n-fold tree combining the n individual trees assigned to each one of the n data lines. Due to the tree structure, it is possible to connect one data line to each of the x+1 channels via data paths of equal length. Therefore, no delay time between signals following a default path and those rerouted is necessarily generated by the rerouting.

While under undisturbed operating conditions the data are transmitted by the default paths, following one of the outer edges of the tree, these data paths are shifted as soon as one to the channel is signaled as being unable to transmit data properly. The rerouting involves not only the path ending at the faulty channel, itself, but also all subsequent paths. The data path ending at the faulty channel is directed into the next of the x+1 channels connected to the data line which has originally used the faulty channel. However, the data path originally ending in the newly occupied channel is redirected to its neighboring channel. This is repeated until the last in the row of data paths is directed into a previously unoccupied redundant channel. In other words, the faulty channel induces a kind of chain reaction causing the rerouting of all subsequent paths. The same holds in case another channel fails.

The size of the tree, i.e. the number of branching levels, is simply related to the number of redundant channels.

In the second array the same data path is established taking into account that the direction of the data or signal flow is opposite to the one in the first array. Thus, installing two similar arrays at opposite ends of the redundant channel bus solves the problem of having to direct the rerouted data signals back to the output line corresponding to the input line from which the data signals originated.

According to the data signal connections between the crosspoints, an array can be described as comprising several planes of crosspoints. The first plane consists of those crosspoints connected to the data input lines, while the last plane of the array is connected to the channels. A plane within the array is defined as comprising those crosspoint cells reached by an equal number of steps, edges, or alternatively, by data paths of equal length. The array is designed to exclude a data transmission between the crosspoints of a single plane allowing only data paths perpendicular to the planes. However, it is possible for the crosspoints to interchange control signals also within a plane. The crosspoints, themselves, are designed to enable high speed application and a cost effective simplicity. A crosspoint comprises means to receive data from two directions and transmit data in two direction, i.e. to serve a data crossing, having one direction as default. Further, it comprises means to receive two control signals and to transmit two control signal. It comprises means to alter the direction of the data flow through the crosspoint and send a control signal to another crosspoint of the same plane if at least one control signal is received. And it comprises means to send a control signal to a crosspoint belonging to a adjacent plane, if at least two control signals are received. The crosspoints of the first and last plane as well as those located at the edge underlie special constrains simply restricting the number of crosspoints they are connected to.

As the means, inverters, gates, bipolar and field-effect transistor switches, flip-flops, etc. complying to these functions are generally known by a person skilled in the art, it is an object to provide a crosspoint requiring a minimum of such logic devices. Preferred embodiments of the crosspoint cells in accordance with the invention using CMOS-technology are described in the example.

Even though it is possible to use the invention for a non-synchronized data flow through the redundant channel bus, a preferred embodiment allows the implementation of a synchronized mode. For this purpose, a clock signal is simultaneously transmitted with the data signals.

It is feasible to enlarge the new device as described for the transmission of the clock signal by one further data line reserved for the clock signal and a corresponding channel. However, in a preferred embodiment of the invention, the clock signal is handled distinctly from the data signals to secure a fast transmission reflecting its importance to the synchronized data transfer.

Therefore, a second multiplexing device for the clock signal is introduced between the data routing arrays described above and the first adjacent channels of the bus, the first of which serves as default clock channel. The number of channels connected to the clock signal preferably equals the number of redundant channels, Thus, the transmittal of the clock signal is guaranteed up to the full exploitation of the redundant channel bus. The multiplexing device comprises means to route the clock signal through the next channel free of faults in case of a failure of the default channel or a preceding channel used for the clock signal. More specifically, it is comprised of clock crosspoint cells arranged in a row. If a previously used channel fails, the clock signal is passed through to the next crosspoint cell, sent via the connected channel, and recollected by a corresponding clock crosspoint cell. The multiplexing device for the clock signal further comprises means for indicating the failure of the default channel and for causing a shift of all data paths by one channel. Thus, the first channel originally used for data transmission is freed for passing the clock signal. By transmitting a control signal to the crosspoints of the last plane of the arrays, the shift can be initiated in consistency with the overall architecture of the device, i.e. by using the ability of the crosspoints to issue signals to all following crosspoints of the same plane. In effect, the clock signal is treated in a preferred manner, as it ousts the data signals from their default channels.

The clock signal can be used to control the data transfer through the whole device. In the synchronized mode, each crosspoint cell within the arrays preferably comprises a clocked register storing the received data and transmitting it with the next clock signal.

DESCRIPTION OF THE DRAWINGS

The invention is described in detail below with reference to the following drawings.

DETAILED DESCRIPTION

Figure 1:
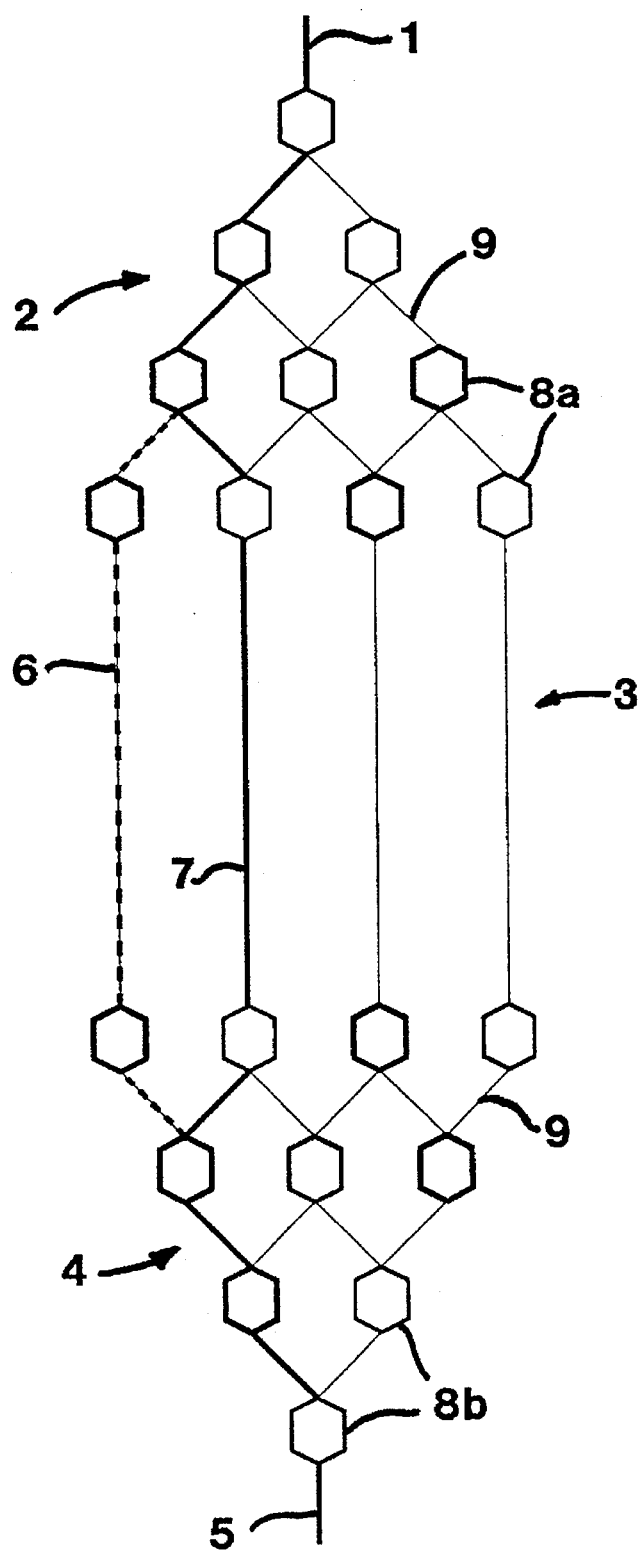
FIG. 1 shows one data line and components connected to it in accordance with the present invention.

In FIG. 1 some of the details of the invention are described as can be found in the complete device. An input data line 1 is shown forming the root of a bifurcating tree 2. The vertices or nodes of the tree are crosspoint cells 8a. Its arcs or edges are formed by data lines 9. The tree 2 has four pending ends each connected to a channel 3. At the other end, the channels 3 are connected to another bifurcating tree 4, which routes into the output data line 5. As described by FIGS. 3A,B, its crosspoints 8b are slightly modified, compared to the crosspoints 8a of the tree 2. The dotted line 6 indicates the default data path, while the solid line 7 shows the data path, assuming that the first of the channels 3 is faulty. Notably, the data path through the tree 4 equals the path through tree 2 disregarding the direction of the data flow. The tree structure of FIG. 1 appears 8-fold in the device shown in FIG. 2, though obscured as most of the crosspoint cells and data lines are shared by more than one input or output data line.

Figure 2:
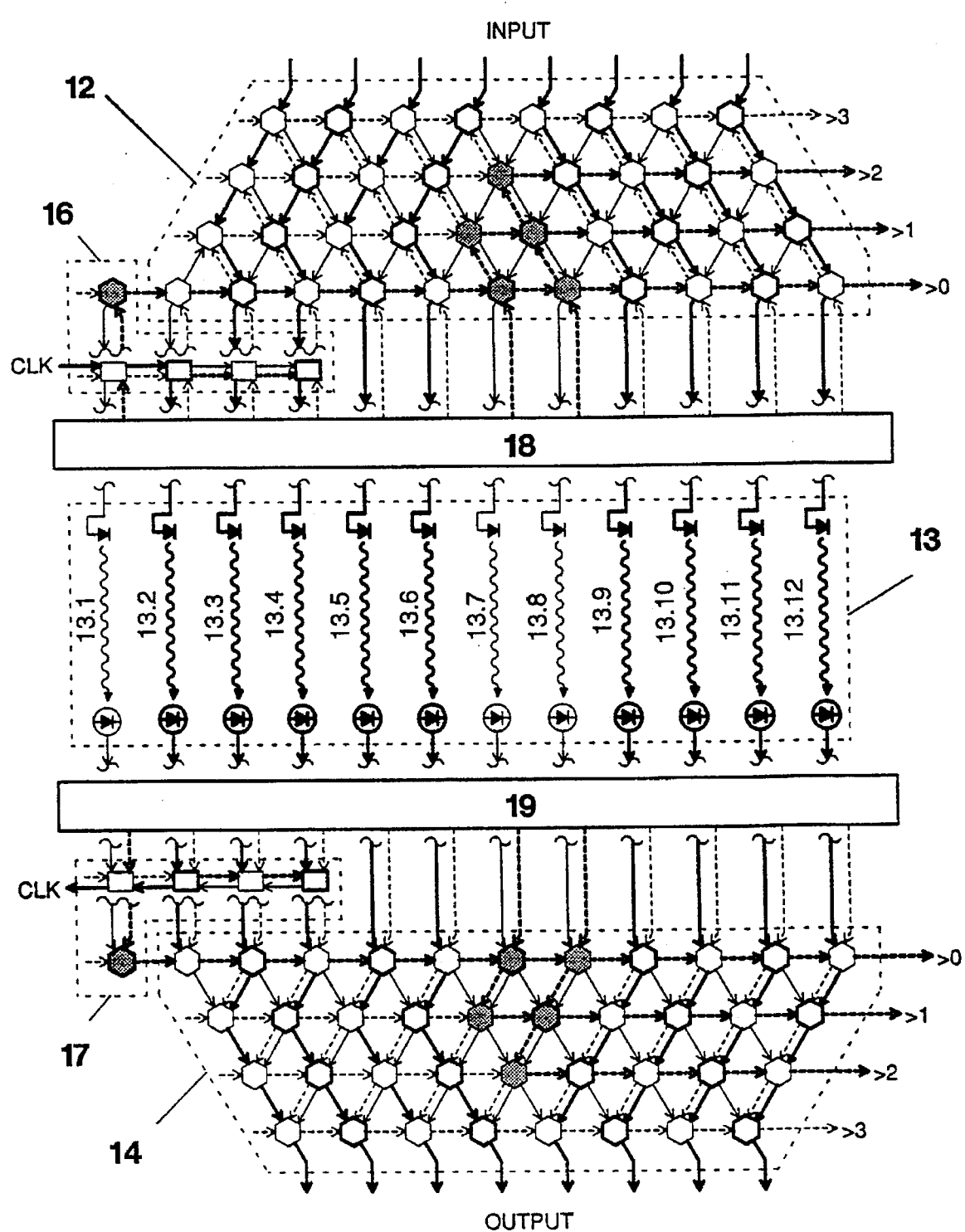
FIG. 2 shows a schematic block diagram of a complete redundant channel bus with a multiplexing device in accordance with the invention.

In the circuit of FIG. 2, the input data are supplied via eight data lines. The data enter a first array of crosspoint cells, the data distributing section 12, which serves as demultiplexer for the redundant channel bus 13. The array comprises eight trees each ending in four channels. It is composed of a minimum number of crosspoint cells necessary to establish said 8-fold tree structure. The redundant channel bus 13 consists of eight default channels for the data transfer, three redundant channels, and one channel reserved for the clock signal. Each optical channel comprises a laser diode, the output of which is transmitted by an optical fiber and a photodiode to conveal the optical signals into electrical signals. The channel bus 13 is followed by a second array of crosspoints, the data collecting section 14, which reroutes the data signals to the correct output line.

The basic tree structure of both arrays 12,14 is blurred by their compact design, leaving planes of crosspoints visible which are in the following used to describe the device in operation. Each array comprises four planes of crosspoints, the first of which is connected to the input or output lines, while the last plane is connected to the bus 13. All crosspoints of one plane are reached by an equal number of steps along the edges of a tree starting from its root, i.e. a data input or output line. The solid lines of FIG. 2 indicate data lines, i.e. lines for transmitting the data from the input side to the output side of the device. The dotted lines of FIG. 2 are reserved for interchanging control signals between the crosspoints. While data transmission is only possible between crosspoint cells of adjacent planes, the signal lines allow the sending of control signals from one crosspoint to a adjacent crosspoint of the same plane.

In the default mode, no control line of the data distributing or collecting section 12,14 is active. Thus, the crosspoints of the second (and all following) plane receive signals only from the, with regard to FIG. 1, right data input line. The other line is blocked by means described below. The data flow keeps its direction and is finally received by the crosspoints of the fourth (last) plane which are connected to the channels 13.2-9 of bus 13.

After passing through the bus 13, the data signals appear at the first eight crosspoints of the fourth plane of the data collecting section 14 and are sent by default, i.e. in the absence of any active control line, to the right one of the two connected crosspoints of the following plane. The data signals are routed through the following three planes by the same default direction and are finally supplied to the, with regard to the input lines, correct output lines.

The clock signal is transmitted separately through the bus 13 by the clock inserting section 16. The following clock extracting section 17 receives the transmitted clock signal and transfers it i.e. to means (not shown) for clocking the data collecting section 14. In the default mode free of failing channels, the clock signals pass via the first clock crosspoint of the clock inserting section 16 through channel 13.1 of the bus 13, and the first clock crosspoint of the clock extracting section 17. Both clock sections 16,17 comprise further clock crosspoint cells which are connected to the channels 13.2-4 which are by default, reserved for the data transmission. This multiplexing device for the clock signal is arranged between the the channel bus 13 and the multiplexing data sections 12,14 to give priority to the transmission of the clock signal, A failure of one of the channels 13.2-4 is simultaneously reported to the connected data crosspoint cells and clock crosspoint cells.

Considering now the case where the channel 13.1, previously used for the transmission of the clock signal, and the data channels 13.7 and 13.8 are faulty and the fault detecting device (not shown) reports such failure to the masking registers 18,19. The masking registers block a faulty channel and activate the control input line of the crosspoint connected to said channel in the data distributing section 12 and in the data collecting section 14, respectively.

The control signal indicating the failure of channel 13.1 is received by the first clock crosspoint of the clock inserting section 16 and clock extracting section 17 and causes them to activate the control line to the second clock crosspoints connected to channel 13.2, and, thus, opening it for the transmission of the clock signal. Simultaneously, a control signal is issued from the clock inserting and extracting sections 16,17 to the crosspoint cells of the data distributing and collecting sections 12,14, respectively, which are connected to channel 13.2 of the bus 13 and through which the data signals of the first data line are transmitted in the default state. This control signal has the same effect to both arrays 12,14 as a failure of channel 13.2. As each crosspoint is designed (see below) to activate at the receipt of one control signal the control line connecting it to the neighboring crosspoint of the same plane, all crosspoints of the last plane of the data distributing section 12 switch the data line from which they by default receive the data signals to the second connected crosspoint of the previous plane (in FIG. 2 to the left). Thus, channel 13.2 of the bus 13 is circumvented and the data signals are, instead, passed through the bus 13 via the channels 13.3-10.

As the first crosspoint of the data collecting section 14 receives a corresponding control signal issued from the clock extracting section 17, it causes the crosspoints of the first plane of this section to switch the direction in which they send the data signals from the default direction, i.e. instead of the right to the left crosspoint of the following plane. In effect, channel 13.2 is equally excluded from supplying data signals to one of the output lines which are in turn supplied via the channels 13.3-10.

Considering now the failure of the channels 13.7 and 13.8, the masking register 18 activates one control line leading to the crosspoint connected to channel 13.7 indicating a failure. Thus, this crosspoint receives two control signals. The second is issued from its neighboring crosspoint and is caused by the failure of channel 13.1, as described above. When the two control input lines of the crosspoint are active, the crosspoint sends a control signal to the crosspoint of the previous plane to which it is connected, As indicated by FIG. 1, the sixth crosspoint of the last (fourth) plane activates the fifth crosspoint of the third plane causing this and the following crosspoint of the third plane to switch the direction from which data signals are received. Considering the failure of channel 13.7 alone, the data flow entering at the fifth input line is now redirected through channel 13.8. But due to the assumed failure of channel 13.8, the sixth crosspoint of the third plane receives a second control input signal causing it to activate the fifth crosspoint of the second plane. In consequence, the data signals of the fifth input line is directed through channel 13.9, and the following data lines are routed via channels 13.10-12.

The crosspoints of the data collecting section 14 receive the control signals from the register 19. As already described, in this section, the control signal causes a change of the direction into in which the data signals are transmitted rather than a change of the direction from which the data signals are received. The changes of the data paths, though, equal those induced within the data distributing section 12. Thus, a rerouting of the data signals into the correct output lines is effected.

In both sections 12,14, the number of faulty channels is advantageously monitored by the control output line of the rightmost crosspoint of each plane. As the number of planes receiving a control signal corresponds to the number of faulty channels, a control signal at the last plane of the data distributing section 12 indicates that at least one channel has failed, a control signal at the third plane indicates that at least two channels have failed and so forth.

Figure 3A:
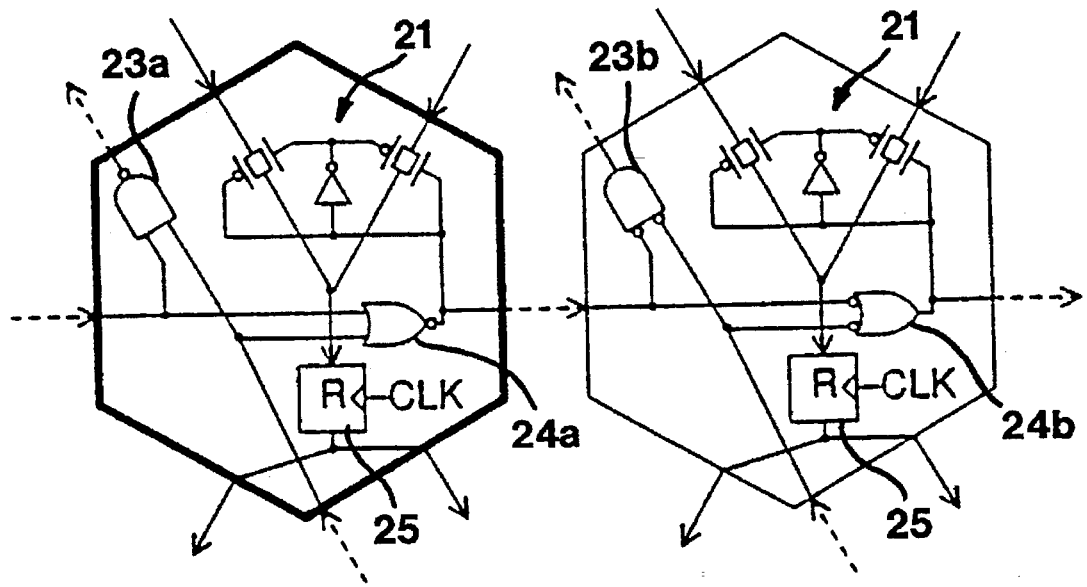
FIGS. 3A,B show details of the crosspoint cells of FIG. 2.
Figure 3B:
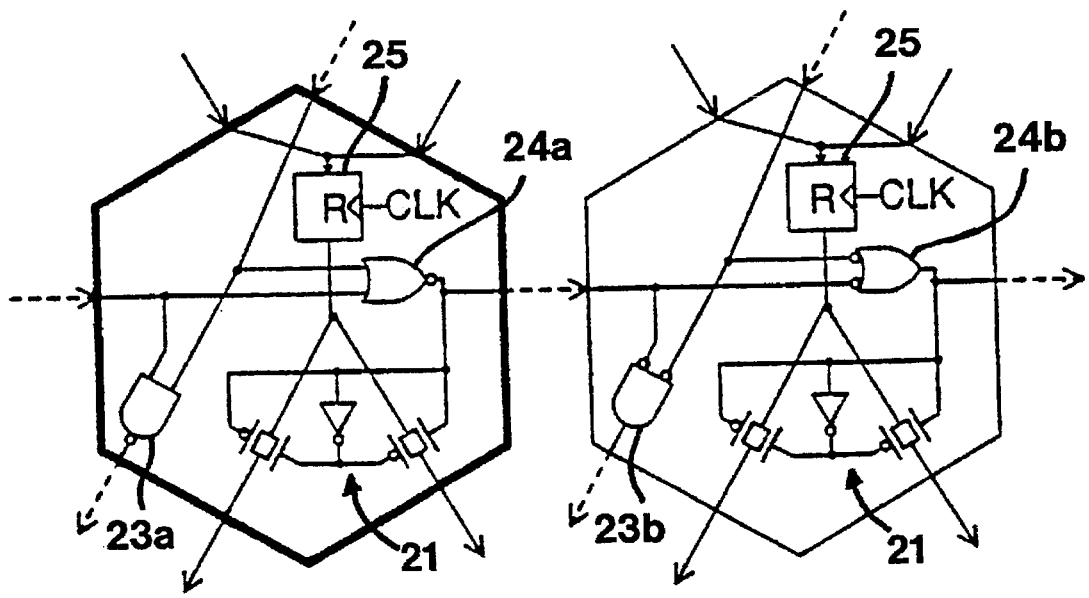

The crosspoint cells making up the data distributing section 12 are called data distributing crosspoints and are shown in FIG. 3A. The crosspoints making up the data collecting section 14 are called data collecting crosspoints and are shown in FIG. 3B. Both types of crosspoints differ only in the arrangement of their elements. These elements consists essentially of one data line gate 21 to block one of two data lines and and two control gates 23a, 24a; 23b, 24b. One gate 24a; 24b is used to control the data line gate 21 and the control line connected to a neighboring crosspoint of the same plane, simultaneously. It switches the gate 21 when receiving a signal from either of the incoming control lines and passes the control signal to the adjacent crosspoint cell. The other control gate 23a; 23b activates the control line connected to one crosspoint cell of a previous plane.

To minimize the number of logic gates and to avoid AND- and OR-gates, which require more transistors than the NAND- and NOR-gates in CMOS-technology, within each plane, the control outputs of the crosspoints alternate between an inverted and non-inverted representation. The inverted cells are characterized by delivering inverted control signals. The placement pattern of the crosspoints is indicated in all Figs. by marking the inverted cells with a thicker boundary: each of the inverting cells is connected by control lines only to non-inverting cells.

The data collecting crosspoints shown in FIG. 3B consist of the same elements as the data distributing crosspoints, but their arrangement within the crosspoint is changed. As the direction of the data flow is reversed, the data collecting cell is designed to switch between the sending lines instead of between the receiving line as in the data distributing cells.

All cells are provided with a register 25 for the data signal, which is controlled by the clock signal. The register is necessary to operate the multiplexing device in a synchronized mode.

Figure 4A:
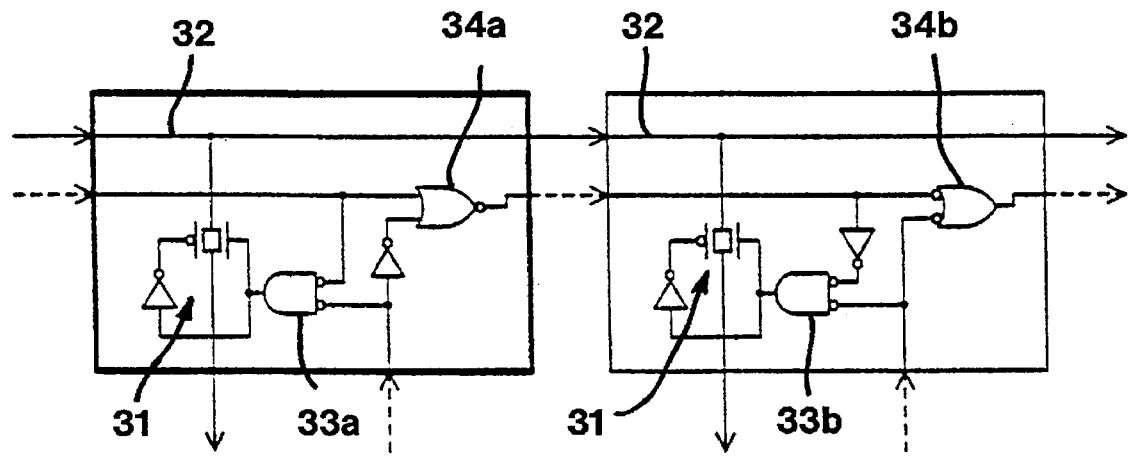
FIGS. 4A,B show details of the clock crosspoint cells of FIG. 2.
Figure 4B:
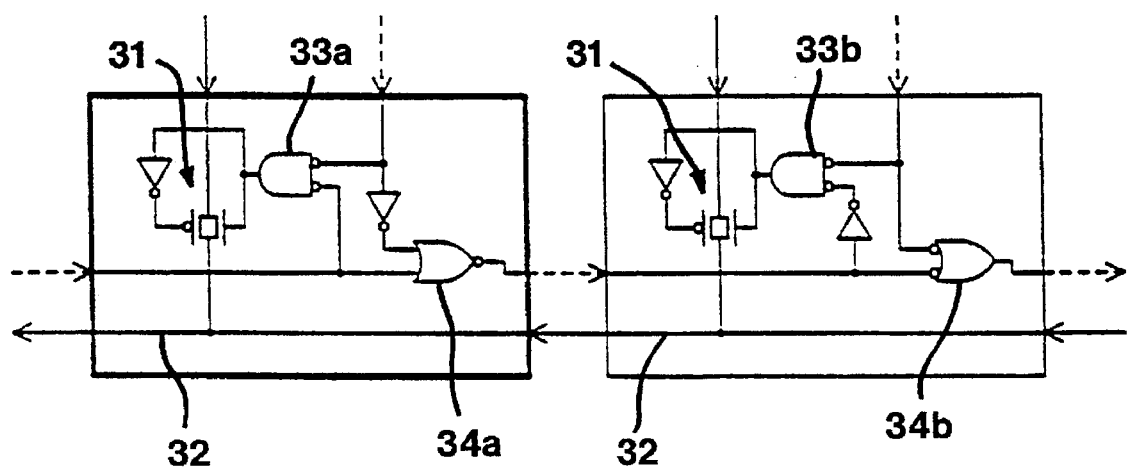

The clock inserting and extracting crosspoints, as shown in FIGS. 4A,B, consists of a data line gate 31 which interrupts the clock signal line 32 from the channel connected to the clock crosspoint. The data line gate 31 is controlled by a gate 33a,b interrupting the data transmission as long as at least one of the two control input lines is active while a second control gate 34a,b activates the control output line connected to the following clock crosspoint when the clock signal is transmitted, i.e. when both control input lines are inactive. Again, this basic design is modified for CMOS technology by using the appropriate inverters to achieve a minimum of gates resulting in an alternating arrangement of clock crosspoints of an inverting (indicated by the thicker border lining) and non-inverting type.

I claim:

1. Multiplexing device for a redundant channel bus (13) having a number of redundant channels, said device comprising n+x channels, wherein x is the number of redundant channels, means (18,19) for recognizing a faulty channel, and two arrays (12,14) of cascaded crosspoint cells, connected to opposite ends of the bus (13), with the crosspoint cells of a first (12) of said arrays having means for establishing n data paths from n input data lines to said n channels of said n+x channels, and the crosspoint cells of a second of said arrays (14) having means for establishing n data paths from said n channels to n output data lines, and each of the crosspoint cells having means for altering a data path which leads over itself, said means being controlled such that the data paths in both arrays of cascaded crosspoint cells are altered identically, said control being exerted by said means for recognizing a faulty channel.

2. Multiplexing device for a redundant channel bus according to claim 1, wherein: each of said arrays (12,14) forms n bifurcating trees (2,4) with a minimum number of crosspoint cells (8a,b), each of the n trees rooting in one of said crosspoint cells connected to a data line (1,5) such that x+1 pending crosspoint cells are connected to x+1 channels, each crosspoint cell comprising means for establishing a data path between the data line (1,5) and one channel of the x+1 channels through each of said arrays (12,14), said data paths and their corresponding data paths in the Second array differing in their data flow direction, and means for rerouting said data path to a neighboring channel within said x+1 channels, if said one channel or any preceding channel is recognized as faulty.

3. The device of claim 1, having means (16,17) for occupying a channel of the redundant channel bus (13) for a clock signal and simultaneously shifting the one of n data paths previously directed to said channel, and all following data paths, by one channel in case that the channel previously used for the clock signal is registered as faulty.

4. The device of claim 1, wherein the crosspoint cell comprise means (23,24) to receive control signals from at least two directions and transmit control signals to at least two different directions, means (21,24) to switch a data path from a first (default) direction to a second direction and transmit a control signal to a first neighboring crosspoint cell if at least one control signal is received, and means (24) to transmit a control signal to a second neighboring crosspoint cell if at least two control signals are received.

5. The device of claim 4, further comprising:

a register (25) controlled by a clock signal to store data signals for synchronized data transmission.

6. The device of claim 4, wherein each of said two arrays (12,14) comprises control signal inverting and non-inverting crosspoint cells arranged such that an inverting crosspoint cell transmits its control signals only to non-inverting crosspoint cells in operation.

7. The device of claim 5, wherein each of said two arrays (12,14) comprises control signal inverting and non-inverting crosspoint cells arranged such that an inverting crosspoint cell transmits its control signals only to non-inverting crosspoint cells in operation.

* * * * *